US008150870B1

(12) United States Patent
Peddy et al.

(10) Patent No.: US 8,150,870 B1
(45) Date of Patent: Apr. 3, 2012

(54) SCALABLE PARTITIONING IN A MULTILAYERED DATA SERVICE FRAMEWORK

(75) Inventors: Nicholas K. Peddy, Kirkland, WA (US); Chelsea C. Krueger, Bellevue, WA (US); Michael J. McCann, Kirkland, WA (US); Suguna Subramaniam, Seattle, WA (US); W. Cary Hall, Seattle, WA (US); Sasan Dashtinezhad, Seattle, WA (US); Guy Bialostocki, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 765 days.

(21) Appl. No.: 11/615,841

(22) Filed: Dec. 22, 2006

(51) Int. Cl.
*G06F 7/14* (2006.01)

(52) U.S. Cl. ........................................ 707/770; 707/968

(58) Field of Classification Search .................. None
See application file for complete search history.

(56) References Cited

U.S. PATENT DOCUMENTS

| 5,490,269 | A  | * | 2/1996  | Cohn et al. ........................... 1/1 |
| 5,799,311 | A  | * | 8/1998  | Agrawal et al. ................ 707/102 |
| 6,115,705 | A  | * | 9/2000  | Larson ................................ 707/3 |
| 6,138,115 | A  | * | 10/2000 | Agrawal et al. .................... 707/3 |
| 6,185,562 | B1 | * | 2/2001  | Dahlen et al. ....................... 707/8 |
| 6,401,098 | B1 | * | 6/2002  | Moulin ............................. 707/102 |
| 6,816,854 | B2 | * | 11/2004 | Reiner et al. .................... 707/770 |
| 6,944,715 | B2 | * | 9/2005  | Britton et al. .................. 711/129 |
| 7,054,867 | B2 |   | 5/2006  | Bosley |
| 7,296,008 | B2 |   | 11/2007 | Passerini |
| 7,299,239 | B1 | * | 11/2007 | Basu et al. ...................... 707/102 |
| 7,313,565 | B2 |   | 12/2007 | Zhang |
| 7,428,220 | B1 |   | 9/2008  | Caronni |
| 7,469,253 | B2 | * | 12/2008 | Celis et al. ..................... 707/101 |
| 7,475,055 | B2 | * | 1/2009  | Hutchison et al. ................ 707/2 |
| 7,480,898 | B2 |   | 1/2009  | Batten |
| 7,680,761 | B2 | * | 3/2010  | Zait et al. ....................... 707/713 |
| 7,945,581 | B2 | * | 5/2011  | Bayliss et al. ................. 707/770 |
| 2002/0147611 | A1 | * | 10/2002 | Greene et al. ..................... 705/1 |
| 2004/0003086 | A1 | * | 1/2004  | Parham et al. ................ 709/226 |
| 2005/0102325 | A1 |   | 5/2005  | Gould |
| 2005/0187897 | A1 | * | 8/2005  | Pawar et al. ...................... 707/1 |
| 2005/0209892 | A1 |   | 9/2005  | Miller |
| 2007/0226177 | A1 | * | 9/2007  | Barsness et al. .................. 707/2 |

OTHER PUBLICATIONS

Bakker, A., et al., "The Globe Distribution Network," Proceedings of 2000 USENIX Annual Technical Conference (FREENIX Track), San Diego, Jun. 18-23, 2000, pp. 141-152.
Stoica, I., et al., "Chord: A Scalable Peer-to-Peer Lookup Protocol for Internet Applications," IEEE/ACM Transactions on Networking 11(1):17-32, Aug. 2001.

* cited by examiner

*Primary Examiner* — Hung Q Pham
*Assistant Examiner* — Hubert Cheung
(74) *Attorney, Agent, or Firm* — Knobbe Martens Olson & Bear LLP

(57) ABSTRACT

A method and system is provided for maintaining customer data in a data store system utilizing a scalable partitioning framework. More specifically, the data store of a customer service system is partitioned (divided) into multiple partitions by a partitionable key of customer data so that each partition owns a subset of the customer data. By maintaining several partitions that store a subset of the customer data exclusive to each other, blackout or brownout problems can be local to one partition and, thus, the availability for the entire system will be increased. Moreover, a set of partitionable keys, a minimal unit to be moved between partitions, is grouped and associated with a partition. By eliminating direct dependencies between the partitions and the partitionable keys, the system can have great flexibility with regard to migrating customer data between partitions and adding a new partition.

26 Claims, 13 Drawing Sheets

SCALABLE PARTITIONING IN A MULTILAYERED DATA SERVICE FRAMEWORK

BACKGROUND

With the increased popularity of the Internet, Internet-based customer services have become increasingly accepted and popular. Network purchase services that enable users to purchase items or services may be one of the most used and favored Internet-based customer services. Network purchase services also provide numerous other services to customers, such as account service, advertisement campaign service, shipping service, customer care service, information search service, and more. Thus, typical network purchasing services tend to maintain information for each customer or each provided service, which results in explosive growth of customer information maintained in the network purchase services databases.

In a typical embodiment, the underlying customer database of such network purchasing services may be a single database where managing data is rather simple and straightforward. However, this type of database can be the single biggest point of failure with respect to data "availability" in the network purchasing services. Generally, there are two primary risks in such database systems: a hard failure in which the database goes down completely (blackout), and a heavy CPU load due to volume that causes the database to be unresponsive or timeout (brownout). One approach to solve the blackout or brownout problems is to maintain a secondary database (backup database), which is a mirror of a primary database, and if there is a problem in the primary database, the system fails over to the secondary database. However, utilizing a backup database may cause its own problem because if the heavy CPU load that took down the primary database is transferred to the secondary database, the secondary database will likely be taken down as well.

Further, such database systems lack database scalability when demand for additional database capacity arises. As the Internet expands, its reach becomes more pervasive as more and more users are using network purchase services. Thus, the volume of the customer information maintained by the network purchase services outgrows the existing database hardware. However, adding new database hardware is an expensive and difficult task that generally requires redistribution or migration of data from existing database hardware to new database hardware and oftentimes deployment of a new software system. Moreover, adding new database hardware may disturb various customer services that require immediate access to the customer information stored in the existing database hardware.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Generally described, a method and system for maintaining customer data in a data store system utilizing a partitioning framework is provided. More specifically, the data store of a customer service system is partitioned (divided) into multiple partitions by a partitionable key of customer data so that each partition owns a subset of the customer data. By maintaining several partitions which store a subset of the customer data exclusive of each other, blackout or brownout problems can be local to one data partition and thus the availability for the entire system will be increased. A set of partitionable keys (bucket) may be grouped and associated with a particular data partition in order to eliminate direct dependencies between the data partitions and the partitionable key. When there is a need for redistribution of customer data over data partitions, buckets, but not individual customer identifiers, will be redistributed. In this manner, the system can have a great flexibility with regard to migrating customer data between data partitions and adding a new data partition.

In accordance with an aspect of the present invention, a computer system for managing customer information in scalable, partitioned data stores is provided. The computer system comprises one or more data stores containing a plurality of mapping tables and multiple data partitions, each of which stores customer information of a separate portion of customers and wherein each data partition is associated with one or more buckets and each bucket contains partitionable keys of several customers. In one aspect, the computer system further comprises a computing device in communication with the one or more data stores. The computing device identifies a bucket which is ready to be reassigned to a new data partition, and identify an old data partition that is currently associated with the identified bucket. A first table is updated to indicate that the identified bucket is in a process of migration from the old data partition to the new data partition. The computing device moves customer information associated with customer identifiers from the old data partition to the new data partition, the customer identifiers being provided from the identified bucket. After moving the customer information, the computing device updates the first table to indicate that the identified bucket is now associated with the new data partition and the migration progress is finished.

In accordance with another aspect of the present invention, a computer-implemented method for accessing information about a customer stored in a data store is provided. The data store includes a plurality of data partitions, each of which contains an exclusive set of information about customers. The computer-implemented method includes receiving a request to access information about a customer, identifying from the request a partitionable key related to the customer, and performing a bucket mapping with the partitionable key to determine a partition. Each partition is associated with at least one bucket that contains partitionable keys of a group of customers. An access request of the information about the customer is sent to a partition corresponding to the partition identification. The access request is formulated suitable for the data partition to understand. Subsequently, a result of the access request is obtained from the data partition corresponding to the partition identification.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, embodiments of the present invention relate to a method and system for maintaining customer data in a data store system utilizing a scalable partitioning framework. More specifically, embodiments of the present invention relate to a method and system for managing a data store of a customer service system that is partitioned (divided) into multiple partitions by a "partitionable key" of customer data so that each partition owns a subset of the customer data and such that the partitions are scalable, as described below. A "partitionable key," as used herein, is an identifier of customer data within a data store, which can be used to determine a partition corresponding to the customer data. An example of a partitionable key may be a customer identifier that is a unique identifier of customer data within a data store.

Each partition is associated with one or more "buckets" in order to eliminate direct dependencies between the partitions and the partitionable keys. A "bucket," as used herein, refers to a set of partitionable keys that are grouped by a hashing algorithm. In one embodiment, customer data are migrated at a bucket level, but not at a partitionable key level. Thus, when there is a need for redistribution of customer data over data partitions, buckets, not individual partitionable keys, can be redistributed.

The following detailed description describes illustrative embodiments of the invention. Although specific system configurations, screen displays, and flow diagrams are illustrated, it should be understood that the examples provided are not exhaustive and do not limit the present invention to the precise forms and embodiments disclosed. Persons skilled in the field of managing database systems will recognize components and process steps described herein that may be interchangeable with other components or steps, or combinations of components or steps, and still achieve the benefits and advantages of the invention.

It should also be understood that the following description is presented largely in terms of logic operations that may be performed by conventional computer components. These computer components, which may be grouped at a single location or distributed over a wide area on a plurality of devices, generally include computer processors, memory storage devices, display devices, input devices, etc. In circumstances where the computer components are distributed, the computer components are accessible to each other via communication links.

In the following description, numerous specific details are set forth in order to provide a thorough understanding of the invention. However, it will be apparent to one skilled in the art that the invention may be practiced without some or all of these specific details. In other instances, well-known process steps have not been described in detail in order not to unnecessarily obscure the invention.

Figure 1:
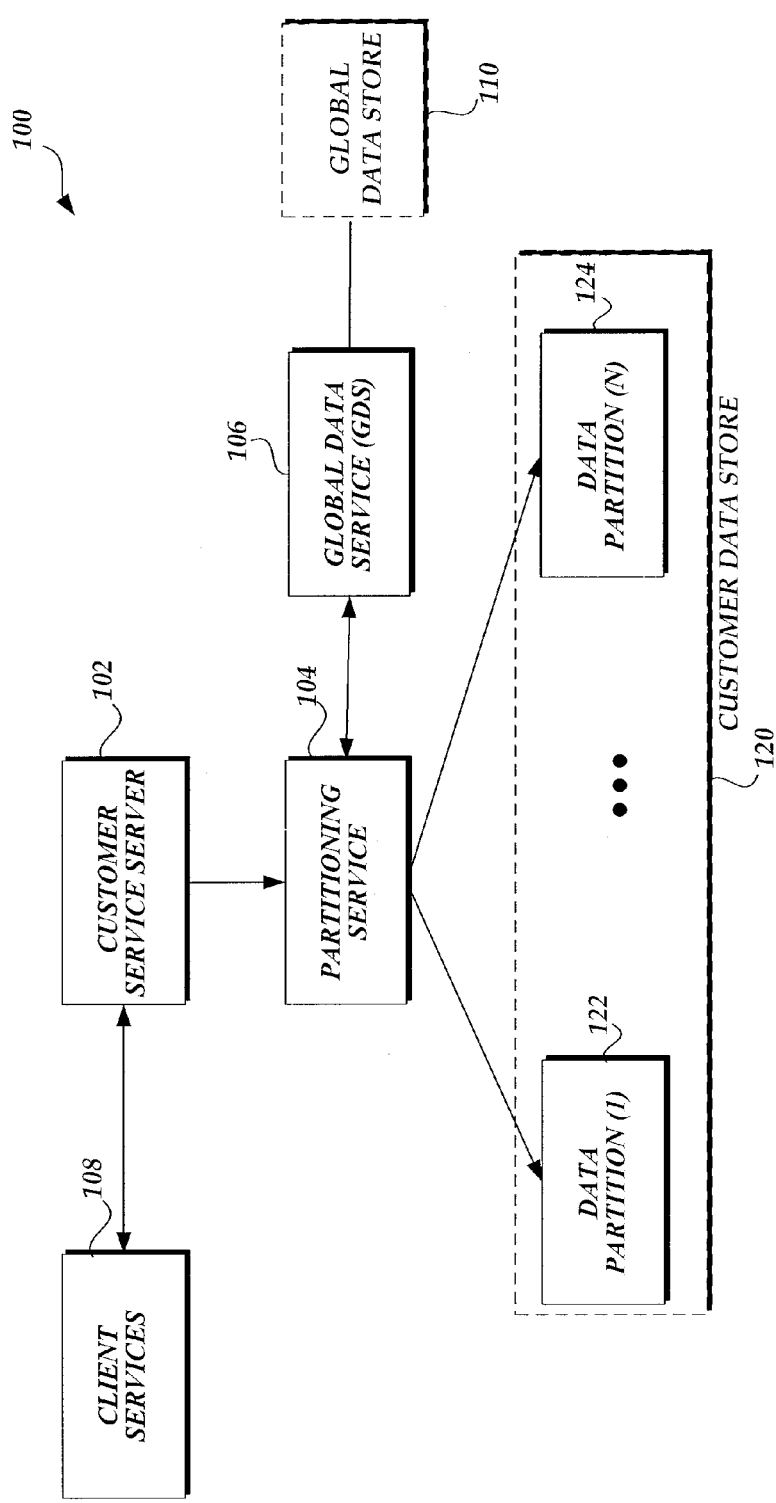
FIG. 1 is a pictorial diagram of an exemplary data store system utilizing a partitioning framework, in accordance with embodiments of the present invention.

Referring to FIG. 1, a block diagram of an exemplary data store system 100 utilizing a partitioning framework is illustrated in accordance with embodiments of the present invention. The illustrative data store system 100 may be utilized by client services 108, such as network purchasing services that facilitate purchase transactions over the Internet, or any Internet-related services that need to access/manage customer data for their services.

The exemplary system 100 may include one or more data stores, including a customer data store 120, a global data store 110, and the like. The customer data store 120 is partitioned (divided) into multiple data partitions, for example, data partitions 122, 124, by partitionable keys. Any mutable key of customer data may be selected as a partitionable key as long as such key of particular customer data can be used to determine a partition corresponding to the particular customer data. An example of a partitionable key may be a customer identifier that is a unique identifier of customer data within the data stores. As will be appreciated by one of ordinary skill in the art, a partitioned data store generally refers to a data store that owns all of the data corresponding to a subset of customers. In one embodiment, each data partition 122, 124 stores customer data of an exclusive subset of customers and, thus, a particular customer corresponds to only one data partition. In this manner, a customer and associated customer data (customer data) are always "homed" on a particular data partition but not on other data partitions. As will be discussed in greater detail below, each data partition 122, 124 may be one or more physical customer databases and replicated for failover purposes.

The global data store 110 is not partitioned but owns some customer data for each customer in conjunction with the underlying business logic functionality for customer services. For example, a customer login name or nickname that can be used for a purchasing transaction may be stored in the global data store 110, separate from the customer data store 120. The global data store 110 may store several mapping tables for managing partitioning logic.

In the exemplary system 100, several service layers may be included for flexible accessing and managing the customer data store and the global data store. In one embodiment, the exemplary system 100 may include a first service layer, for example, a customer service server 102, which is responsible for routing and aggregating customer data with respect to a request to access customer data or other information related to customers. The customer service server 102 may receive messages from the client services and determine the appropriate service from which to access customer data. The customer service server 102 further determines which requests are serviced by the global data store 110 and which are serviced by the customer data store 120. In the case of multiple sources required to fulfill a request, the customer service server 102 may aggregate across those sources.

The second service layer may be a partitioning service 104 that is responsible for providing a unified interface to the customer data store and obfuscating the underlying partitioning architecture to the customer. The third layer may be data partitions 122, 124. In one embodiment, each data partition includes a data partition service which is responsible for managing its corresponding data partitions 122, 124. The partitioning service 104 may provide a thin service layer for interacting with the customer data store 120. It is also responsible for managing partitioning logic across all partitions 122, 124. By maintaining several service layers, new partitions can be added without requiring any software change in client services 108. When a new partition is added to the customer data store, the partitioning service 104 only has to be configured to talk to the new data partition or data partition service of the new partition. Additionally, an underlying data store technology used for the data partitions can be changed transparently without affecting the client services since the way that the customer service server 102 communicates with the client services can remain the same regardless of the change in the underlying data store technology.

The partitioning service 104 may also communicate with a global data service 106 that is responsible for accessing the global data store 110, which owns customer data in conjunction with the underlying business logic functionality. Alternatively, the partitioning service 104 and global data service 106 can be merged into one service layer for accessing any data stores in the system 100.

For the purpose of discussion, examples and embodiments described herein may be discussed in conjunction with a customer data store having a customer identifier as a partitionable key. However, it is to be understood that any key of customer data can be selected as a partitionable key as long as the key can be used to determine a partition corresponding to the customer data.

Figure 2:
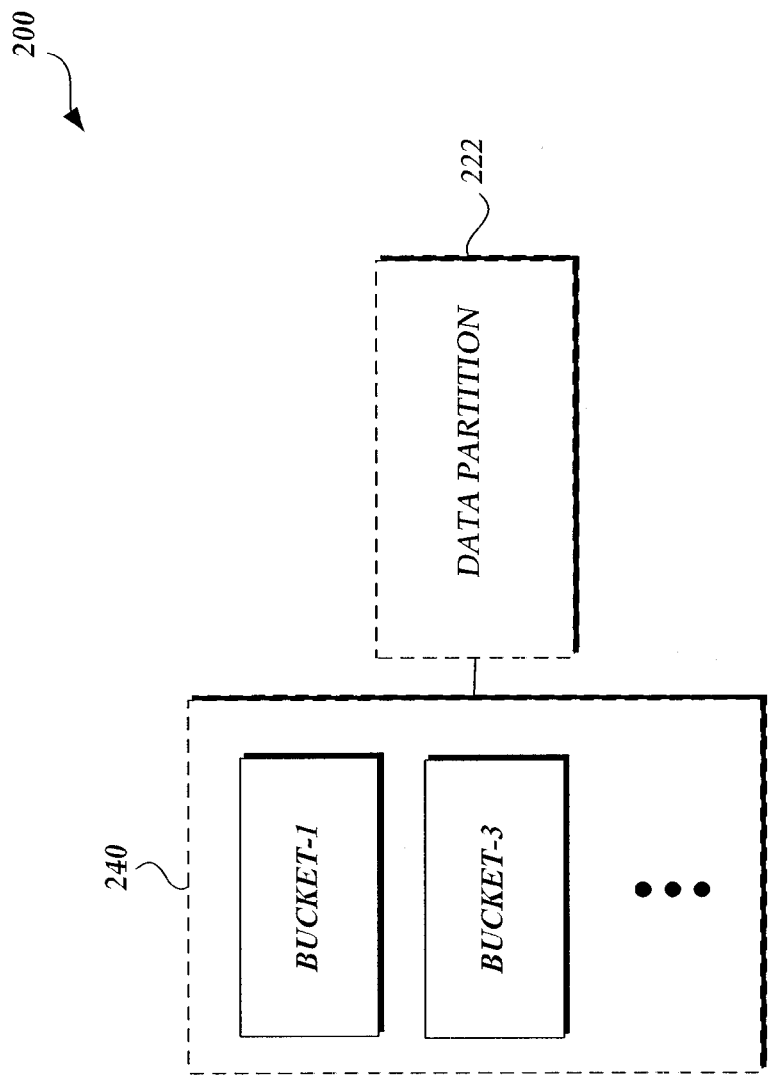
FIG. 2 is a block diagram of an exemplary partition and associated buckets, in accordance with embodiments of the present invention.

Referring to FIG. 2, a block diagram 200 illustrates a data partition 222 associated with one or more buckets 240 in accordance with embodiments of the present invention. Within the customer data store, each data partition is associated with one or more buckets. Those buckets are used to eliminate direct dependencies between the data partitions and partitionable keys (e.g., customer identifiers). In one embodiment, the relationship between a bucket and a data partition may be stored in a bucket-to-partition mapping table that is stored in the global data store 110. Each bucket contains a subset of customer identifiers of customers "homed" on the corresponding data partition. For example, if a data partition is associated with bucket-1 and bucket-3, the customer identifiers of customers who are "homed" on the data partition may be divided in bucket-1 and bucket-3. When there is a request to access customer data of a customer, a bucket containing the customer identifier of the customer may be identified to route the request to a proper data partition. In this manner, all data requests and updates for a particular customer go to the same data partition through a bucket-to-partition mapping. Likewise, because the specific data partition can be identified, there is no need to search all data partitions.

In one embodiment, a hash function that hashes a customer identifier to a unique bucket identifier (e.g., a unique number) pointing to a corresponding bucket may be utilized. As will be discussed in greater detail below, a hash function may be determined in such a way that, through the hash function, customer identifiers (or particular partitionable keys) can be distributed evenly across data partitions, which will lead to evenly-distributed database loads across the data partitions. The data partition 222 may include its corresponding data partition service which is in charge of managing and accessing customer data in the data partition 222. For example, upon receipt of a request to access customer data of a customer, the partitioning service 104 identifies which data partition a given request should go to, via a bucket-to-partition mapping using the customer ID of the customer. Then, the partitioning service 104 forwards the request to the identified data partition 222. Subsequently, the requested customer data is accessed and the result is provided to the partitioning service 104.

As mentioned above, utilizing buckets (a bucket-to-partition mapping scheme) may remove any direct dependency between customer IDs and data partitions. It is well known in the art that such dependency would not only introduce a dependency within the customer data store, but also limit a scalability of the customer data store. In one embodiment, a fixed number of buckets may be chosen with a consideration of potential scalability within the customer data store 120 in order to achieve a manageable data set for a long period. However, it should be understood that the customer data store can be partitioned and maintained without utilizing buckets. For example, the data partitions and customer IDs have direct mapping relationships, thereby eliminating the need for buckets.

Figure 3:
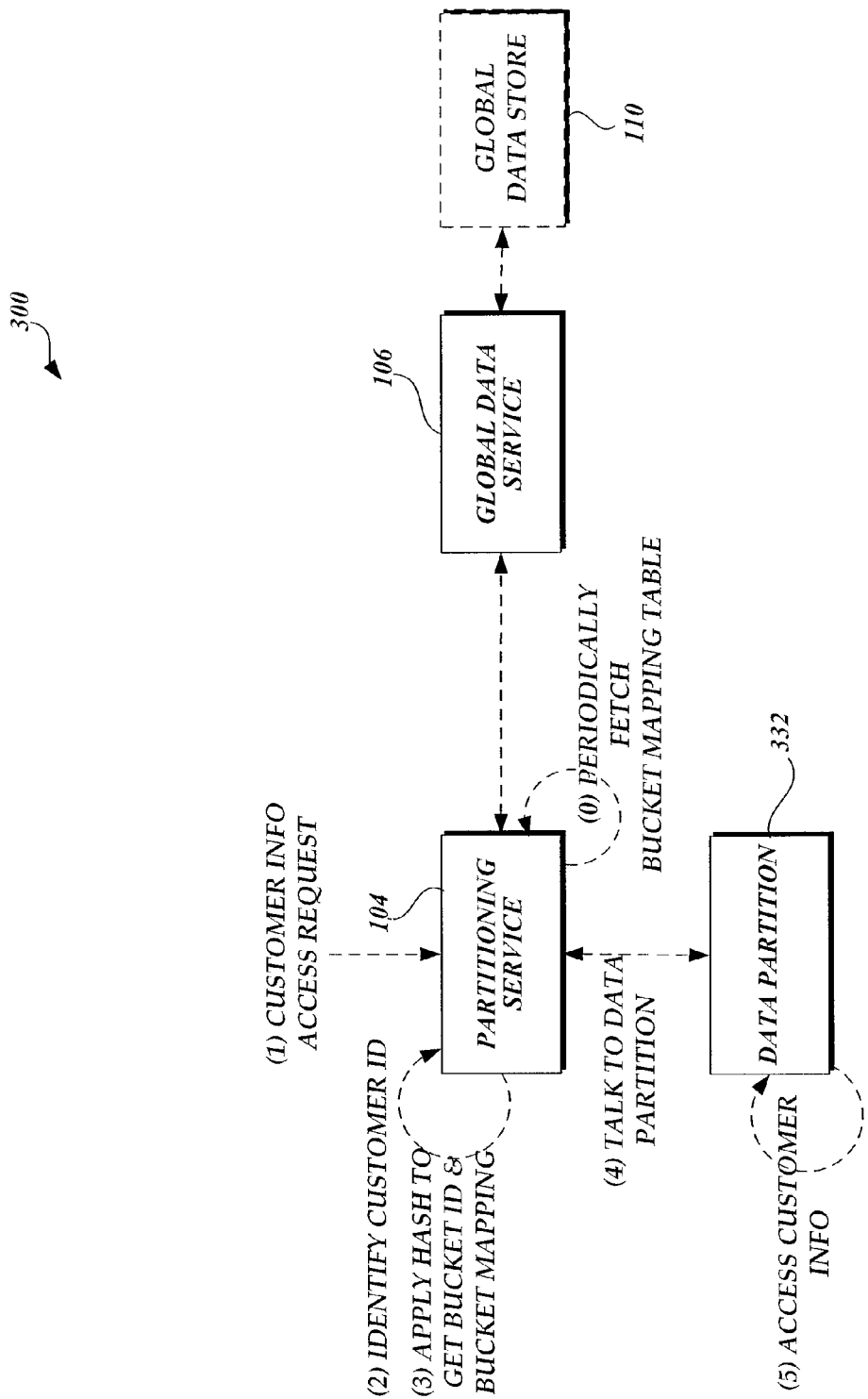
FIGS. 3-4 are pictorial diagrams showing interactions among various components in a data store service system with partitions when a request to access customer data is received, in accordance with embodiments of the present invention.

Referring to FIG. 3, a pictorial diagram 300 shows interactions among various components in the exemplary data store system 100 where a request to access customer data is received from client services in accordance with embodiments of the present invention. For the purpose of discussion, assume that a request to access customer information about a customer is forwarded to the partitioning service 104 from the customer service server 102. Assume further that the request includes the customer ID of the customer.

Upon receipt of the request, the partitioning service 104 may process the request and identify the customer ID of the customer. For example, if a request to access the billing address of John Smith with customer ID "234568" is received, the partitioning service 104 will identify "234568" for the request. Subsequently, the partitioning service 104 may use a hash function to transform the customer ID to a bucket identifier (bucket-ID) of a bucket that corresponds to the customer. It is to be understood that the hash function may be defined, as appropriate, to determine, based on a customer ID, a bucket associated with a data partition which currently stores the customer data. As will be appreciated by one of ordinary skill in the art, any suitable hash algorithm can be used for that purpose. In one embodiment, the hash function is determined in such a way that an even distribution of customer IDs across the buckets can be assured. In this manner, once the buckets are evenly distributed across data partitions, the database load is also evenly distributed across data partitions, which will lead to less of a chance of brownout or blackout in the data store system. This approach may also work when there is a very small percentage of customers who are "power customers" creating a large volume of data access transactions since the power customers can be evenly distributed across data partitions.

As an example, a meaningful portion of a customer ID may be selected, for example, the first six digits of the customer ID, and transformed into a bucket-ID through a hash function which can be defined as:

$$((K0+(10*K1))+((K2+(K3*10))*B)+((K4+(K5*10))*B^2)) \% N = \text{bucket}$$

where B=base, N=number of buckets, K[0-5]=digits of the customer ID.

For an efficient process, the partitioning service 104 may periodically pre-fetch from the global data service 110 a bucket-to-partition mapping table into an in-memory cache. The partitioning service 104 may use the bucket-to-partition mapping table to identify the data partition associated with the bucket-ID. The partitioning service 104 forwards the request to the identified data partition. Subsequently, the identified data partition 332 processes the request and accesses the customer information of the customer in accordance with the request. For example, if the request is a query of the billing information of John Smith, the data partition 332 may query the billing information of John Smith (e.g., accessing a data record having the customer ID="234568") and return the billing information to the partitioning service. For another example, if the request is to update the credit card information of John Smith, the data partition 332 may update the credit card information of John Smith (a record having the customer ID="234568") and return the result to the partitioning service 104.

Figure 4:
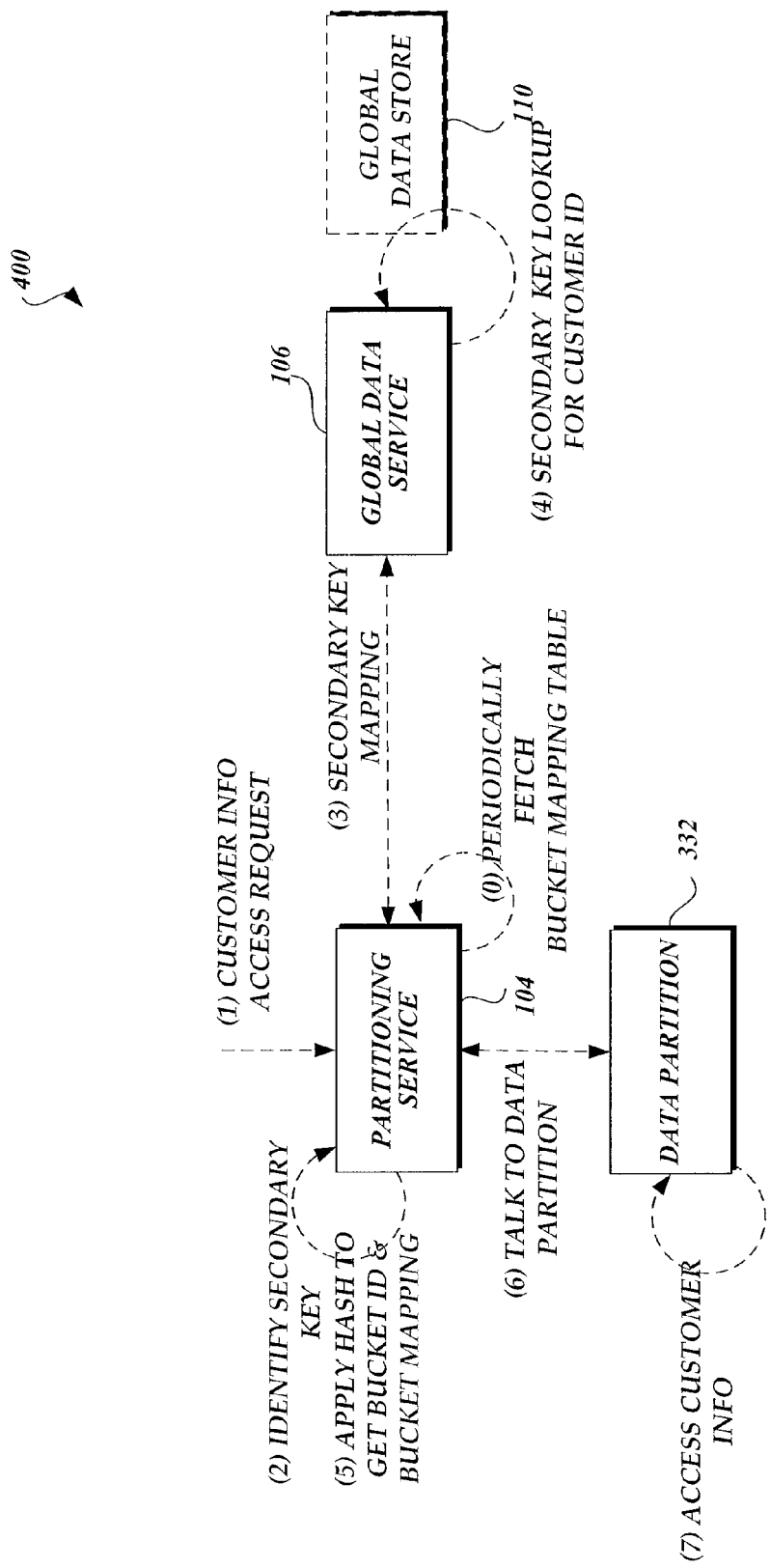

Referring to FIG. 4, a pictorial diagram 400 shows interactions among various components in a data store service system with data partitions when another request to access customer data is received in accordance with the present invention. In one embodiment, the customer service server 102 also supports some requests that do not involve customer IDs but "secondary keys" of customer data. A "secondary key," as used herein, refers to any non-partitionable key of customer data, which is different from a partitionable key (e.g., customer ID) used to determine a corresponding partition in the data store. For example, a secondary key may be a customer's nick name, an email address, a telephone number, etc. In an illustrative embodiment, the global data store may store several secondary key mapping tables through which secondary keys are mapped to a customer ID rather than directly to the data partition where the customer is "homed." In this manner, minimal updates in the global data store will be required, for example, only the bucket-to-partition mapping table needs to be updated in the event that a bucket is moved (migrated) to a new data partition. Each secondary key may have a separate mapping table, to allow for differences in types of secondary keys as well as to make the global data store maintenance easier.

As with FIG. 3, consider that a request to access customer information about a customer is forwarded to the partitioning service from the customer service server and the request does not include the customer ID of the customer but, instead, includes a secondary key of the customer. For the purpose of discussion, assume that the secondary key has a secondary key mapping table contained in the global data store.

Upon receipt of the request, the partitioning service 104 may identify the secondary key (e.g., nickname, etc.) of the customer and the partitioning service 104 may communicate with a global data service 106 that is responsible for maintaining secondary key mapping tables. The partitioning service 104 obtains the customer ID from the global data service 106 that performs a lookup on a secondary key mapping table which is specific to the identified secondary key and applies a hash function to get a bucket-ID of a bucket that corresponds to the customer. The partitioning service 104 may use the bucket-to-partition mapping table to determine the partition identifier associated with the bucket that corresponds to the customer. For an efficient process, the bucket-to-partition mapping table may be periodically pre-fetched from the global data store in a memory cache by the partitioning service 104. The partitioning service 104 further identifies a data partition associated with the determined partition identifier and forwards the request to the identified data partition. The data partition processes the request and, based on the request, accesses the customer information of the customer.

As will be discussed in greater detail below, the secondary key mapping tables contained in the global data store may cover a few selected secondary keys and, thus, some secondary keys may not have a mapping relationship with a partitionable key (e.g., customer ID). In such a case, the partitioning service 104 may broadcast a request to several data partitions and aggregate results from data partitions.

Figure 5:
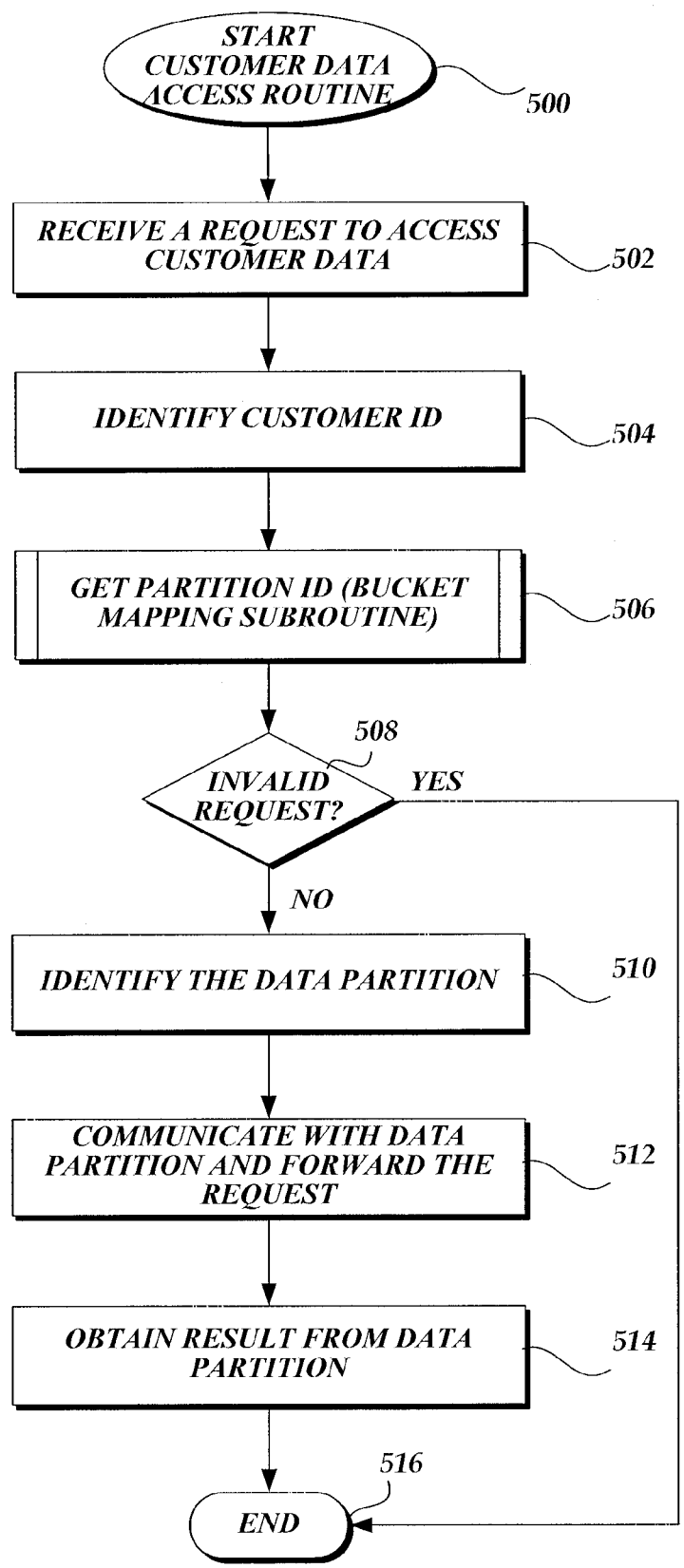
FIG. 5 is a flow diagram of a customer data access routine for accessing customer data from a partition in response to a request, in accordance with embodiments of the present invention.

Referring to FIG. 5, a flow diagram depicts a routine for accessing customer data stored in a data partition in accordance with an embodiment of the present invention. As with FIG. 1, assume that the customer service server 102 receives requests from the client services 108 and determines the appropriate service from which to access customer data. Assume further that the request includes the customer ID of the customer data or the secondary key that can be mapped to the customer ID of the customer data. After determining which requests are serviced by the global data store 110 and which are serviced by the customer data store, the customer service server 102 sends requests with the information relevant to process the request to the partitioning service 104 and waits for the results.

Figure 6:
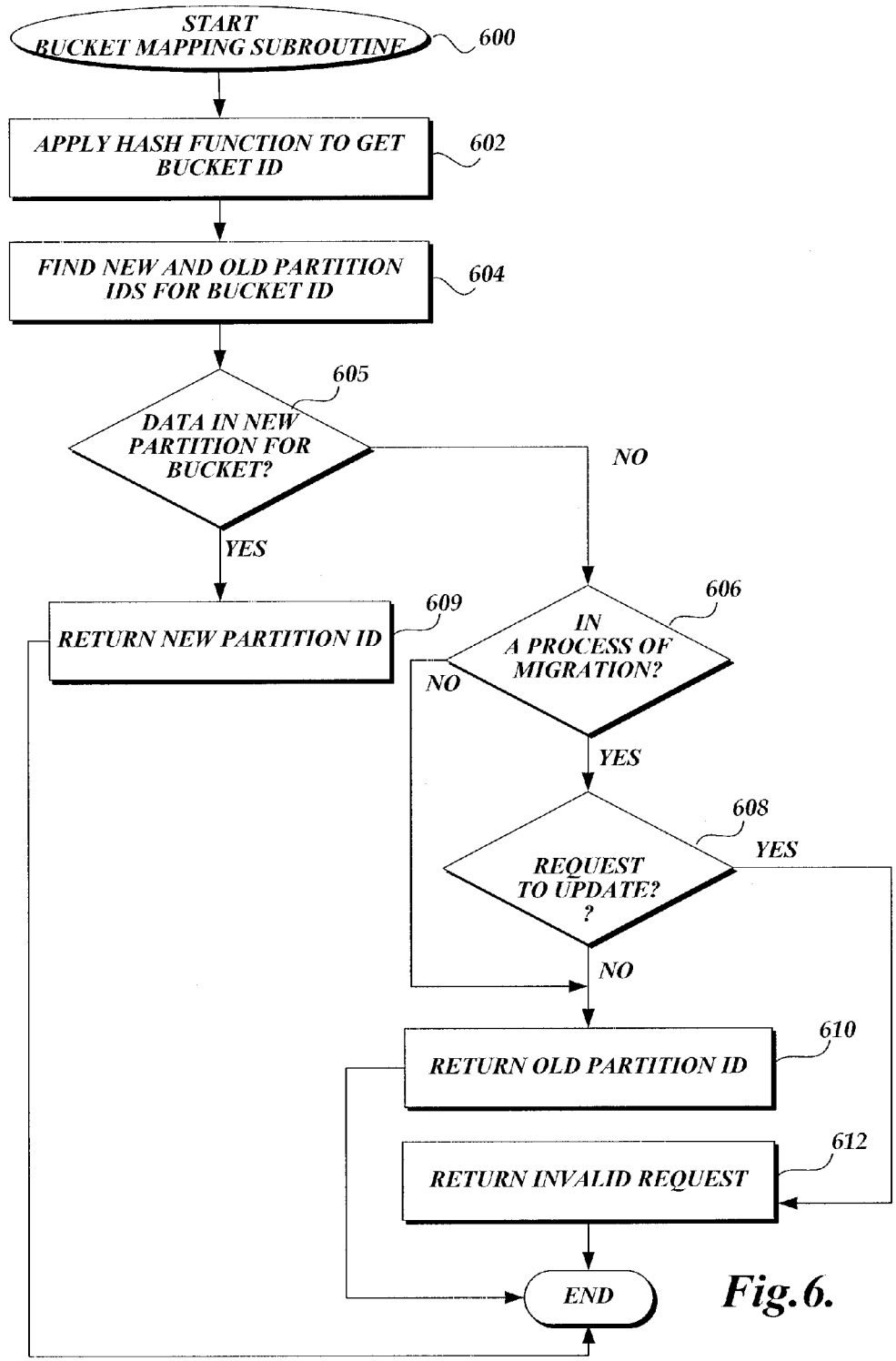
FIG. 6 is a flow diagram of a bucket mapping routine for determining a partition corresponding to a bucket, in accordance with embodiments of the present invention.

Beginning at block 502, the partitioning service 104 receives a request to access customer data of a customer from the customer service server 102. At block 504, the partitioning service 104 may identify a customer ID of the customer from the request. As mentioned above, if the service requested by the client services is about a secondary key of the customer, the partitioning service 104 may identify the secondary key first and the customer ID of the customer may be obtained from a secondary to partitionable key mapping. In one embodiment, the partitioning service 104 may communicate with the global data server 106 for the secondary to partitionable key mapping. The global data service 106 is responsible for managing the global data store that contains a bucket-to-partition mapping table and several secondary key mapping tables. The partitioning service 104 may obtain the customer ID of the customer from the global data service 106. At block 506, a partition ID of a partition where the customer data is "homed" may be determined via a bucket mapping subroutine 600 (FIG. 6). As will be discussed in greater detail below, the bucket mapping subroutine 600 may hash the identified customer ID to a bucket and look up the bucket-to-partition mapping table to get a partition associated with the bucket. To that end, the bucket mapping subroutine 600 will return the partition ID or an invalid request if the request cannot be severed for some reason. At decision block 508, a determination is made as to whether the request is invalid and thus no partition ID has been returned from the bucket mapping subroutine 600. If a partition ID of the data partition where the customer ID and the customer are "homed" has been returned from the bucket mapping subroutine 600, at block 510, the partitioning service 104 may identify a data partition associated with the partition ID. Subsequently, the partitioning service 104 may communicate with the data partition and the request is forwarded to the data partition as illustrated at block 512. At block 514, the partitioning service 104 obtains a result for the request from the data partition. The data partition processes the request and accesses the customer information of the customer in accordance with the request. For example, the request can be a query, delete, or edit of the customer information of the customer. The data partition may perform necessary actions based on the request and provide the result to the partitioning service 104. After obtaining the result (block 514) or after determining that the request is invalid (decision block 508), the routine 500 completes at block 512. The partitioning service 104 will provide the result to the customer service server 102 that is responsible for communicating with the client services.

In one embodiment, each data partition may include a data partition service responsible for managing the data partition. In this embodiment, the partitioning service 104 may communicate with the data partition service of the identified data partition to access customer data.

Referring to FIG. 6, a flow diagram depicts a subroutine for bucket-to-partition mapping in accordance with an embodiment of the present invention. As with FIG. 5, assume that the partitioning service 104 has identified or obtained the customer ID of the customer whose data has been queried.

Beginning at block 602, a hash function may be applied to the customer ID and produce a bucket-ID which is a unique identifier (e.g., a number) pointing to a bucket where the customer ID belongs. As mentioned above, a bucket contains a set of customer IDs. At block 604, information relevant to the bucket may be determined through a lookup on the bucket-to-partition mapping table that represents a bucket-to-partition relationship in the data store and the current state of buckets.

In an illustrative embodiment, the bucket-to-partition mapping table may have several values for each entry for a bucket-ID including a "partition-ID" field which is an old data partition with which the bucket is currently associated; a "new partition ID" field which is a new data partition to which the bucket is newly assigned for a migration; a "flag" field which indicates the state of the bucket, etc. As such, the bucket-to-partition mapping table may provide information relating to a bucket and an associated data partition so that if a bucket-ID is determined based on a customer ID, a data partition where the customer ID is "homed" can be determined.

For example, if a first data partition (partition-ID=1) has two buckets, bucket-ID=1 and bucket-ID=4, respectively, and a second data partition (partition-ID=2) has two buckets, bucket-ID=2 and bucket-ID=3, respectively, the bucket-to-partition mapping table will represent those relationships so that with a particular bucket-ID, a corresponding data partition can be determined. Further, the mapping table also provides migration information, for example, by a flag indicating whether the bucket is in the process of migration.

An exemplary bucket-to-partition mapping is set forth below in the following table.

| Bucket-ID | Partition-ID | New Partition ID | Flag |
|-----------|--------------|------------------|------|
| 1 | 1 | 3 | 1 |
| 2 | 2 | 4 | 0 |
| 3 | 2 | 5 | 0 |
| 4 | 1 | 1 | 0 |

In one embodiment, when a new data partition is added to the data store system, existing buckets may be reassigned (or redistributed) to the data partitions in order to distribute load balance among the data partitions. As a bucket is reassigned to a new data partition (a destination data partition to which the bucket is to be migrating), data of customers whose IDs are contained in the bucket may be moved from an old data partition (a source data partition from which the bucket is to be migrating) to the new data partition. When new customers' data corresponding to the bucket are created, the created new customer data may be inserted into the new data partition just before or during the process of migration. In this way, the partition service 104 can begin putting a load on the new data partition (e.g., new data partition) immediately, and maintaining the set of customers in the bucket stored on the old data partition as constant, which makes the number of customers whose data is to be migrated constant. Further, the partitioning service 104 can easily verify when the migration is completed without checking the old data partition for newly-added customers' data.

At decision block 605, a determination is made as to whether the customer data corresponding to the customer ID is associated with the new data partition. For example, if the customer data corresponding to the customer ID has been created in the new data partition or is to be created in the new data partition, the customer data is associated with the new data partition before the migration process is finished. If it is determined at decision block 605 that the customer data corresponding to the customer ID is associated with the new data partition, at block 609 the new data partition ID corresponding to the bucket may be returned.

If it is determined at decision block 605 that the customer data corresponding to the customer ID is associated with the old data partition, at decision block 606 a determination is made as to whether the bucket is in a process of migration. In order to maintain the customer data's integrity, the bucket may be locked (e.g., deny updates) for a period of time while the customer data are migrated to the new data partition. Thus, during the process of migration, the customer data within the old data partition cannot be accessed for update. At decision block 608, a determination is made as to whether the request is to update the customer data. If it is determined at decision block 608 that the request is to update the customer data, at block 612 the subroutine returns an invalid request indicating that the request cannot be served. If it is determined at decision block 606 that the bucket is not in a process of migration or if it is determined at decision block 608 that the request is not to update the customer, the old data partition ID associated with the bucket ID will be returned. The subroutine 600 completes at block 614.

Figure 7:
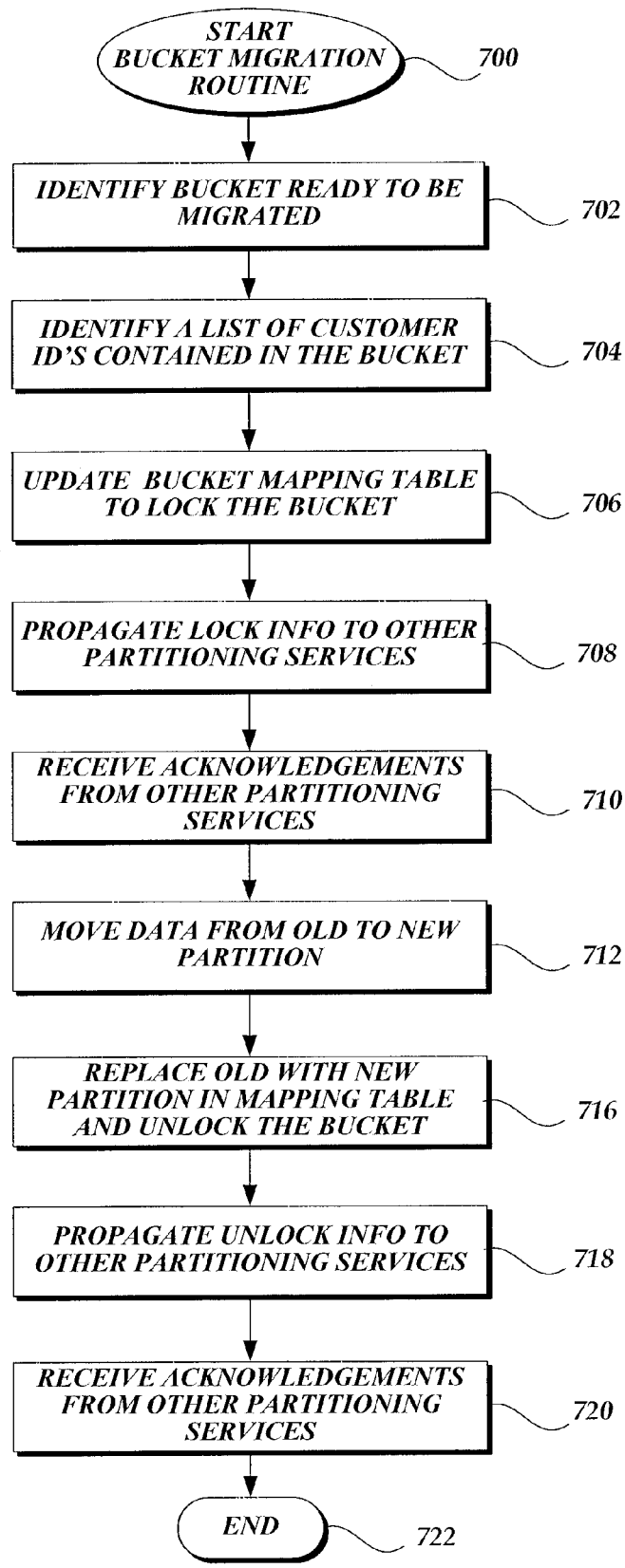
FIG. 7 is a flow diagram of a bucket migration routine for customer data migration from one partition to another, in accordance with embodiments of the present invention.

Referring to FIG. 7, a flow diagram depicts a bucket migration routine for customer data migration from one data partition to another in accordance with embodiments of the present invention. Beginning with block 702, the partitioning service 104 may identify which bucket to migrate to which data partition. For example, if a new data partition is added, a bucket ID that is ready to be associated with the new data partition may be identified. Once this information has been determined, the bucket-to-partition mapping table may be updated to reflect the new data partition and old data partition of the identified bucket.

At block 704, a list of customer IDs that are contained in the identified bucket may also be determined. At block 706, the bucket-to-partition mapping table may be updated to indicate the bucket is locked due to a process of migration. The flag field in the bucket mapping table is marked to indicate that the bucket is locked. At block 708, if there are other partitioning services that access the customer data store, the information of the locked bucket may be propagated to those services. While a bucket is being locked, the customer data within the old partition may not be accessed for update. For example, the customer data can be accessed for a read request but not for an update request in order to maintain data integrity across data partitions. After receiving an acknowledgement from the other services as illustrated at block 710, the partitioning service 104 may start moving customer data based on the list of customer IDs from the old data partition to the new data partition, as illustrated at block 712. At block 716, the bucket-to-partition mapping table reflects that the bucket now corresponds to the new data partition, not the old data partition, and the bucket is unlocked so that the migrated customer data can be accessed via the new data partition. In addition, the flag in the bucket mapping table is cleared to indicate that the migration has completed. In addition, the flag in the bucket mapping table is cleared to indicate that the migration has completed, and the old data partition in the bucket mapping table is overwritten with the new data partition. At block 718, if there are other partitioning services that access the customer data store, the information of the unlocked bucket may be propagated to those services. At block 720, acknowledgements are received from the other partitioning services. The routine 700 completes at block 722.

In some instances, one or more data store systems that are dedicated to certain geographic regions (e.g., countries, continents, etc.) may be utilized by the client services. Further, it is beneficial to maintain separate data partitions for each region's customers simply because preferred languages, customs, regulations, shipping methods, time zones, etc., are different. As described above, each data partition will have its own replication to a warm failover secondary database; however, replication may not exist between regions. Thus, a separate bucket map table (buckets-to-partition) for each region may be maintained.

In this embodiment, a partitioning service for one region can receive a request to access customer data "homed" in another region. The request may be forwarded to the partitioning service associated with the region where the customer and customer data are "homed." One example of such requests may be a request related to "cross-shopping" within the client services 108. "Cross-shopping," as used herein, refers to an activity of a customer whose account was created in one region generating a request that is to be served out of another region.

For example, assume that there are two data store systems, one that covers the North American region and a second that covers the United Kingdom region, and a particular customer's account is "homed" in the data store systems for the North American region. If the customer accesses a Web site provided by the United Kingdom region, which leads the partitioning service of United Kingdom regions to communicate with the partitioning service of the North American region, the customer engages in "cross-shopping" activities. One simple example of "cross-shopping" is that a customer of a network purchase service for the North American region tries to purchase an item offered by a network purchase service for the United Kingdom region. The network purchase service for the United Kingdom region may send a service request to access a customer account to a customer service server for the United Kingdom region. The request is forwarded to the partitioning service for the United Kingdom region. The partitioning service for the United Kingdom region finds that the request will be served by the North American region and forwards the service request. Subsequently, the partitioning service for the North American region returns the customer account after accessing its data store, as described above. It is to be understood that "cross-shopping" is not limited to network purchasing related activities, but rather includes various other activities including, but not limited to, any "shotgun" type APIs, some "get-by-partition" type APIs, non-Web site traffic, and other cases such as institutional buying that relate to customers. A "shotgun" type API refers to an API that queries data from all data partitions (in various regions) based on some secondary keys for which no secondary key mapping table is available, or that are difficult to index. A "get-by-partition" type API refers to an API that queries data from several data partitions (in various regions) based on non-unique secondary keys which can be mapped to one or more customer IDs.

Figure 8:
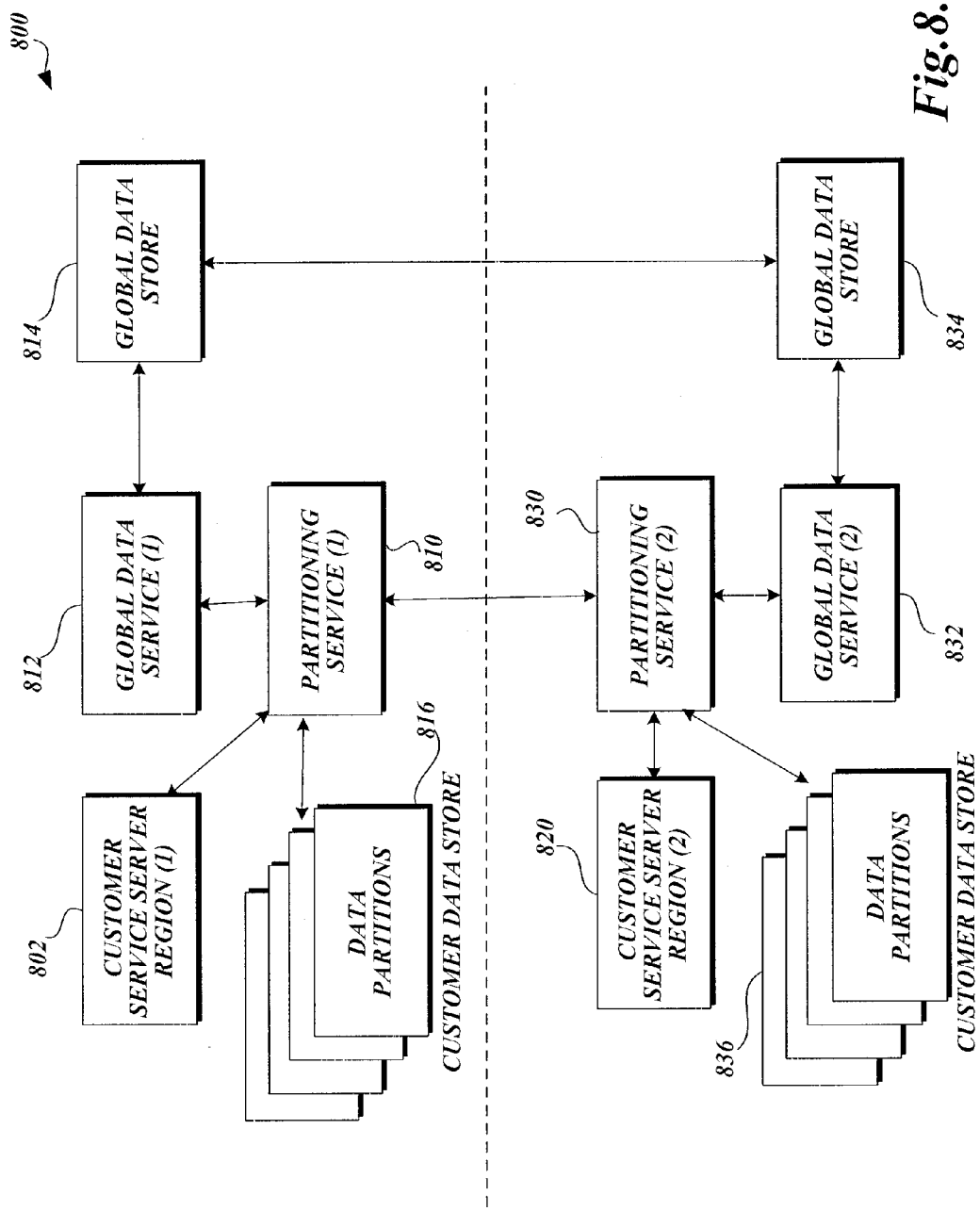
FIG. 8 is a pictorial diagram depicting an exemplary environment to implement several data store systems that are dedicated to a certain geographic region, in accordance with embodiments of the present invention.

Referring to FIG. 8, a pictorial diagram depicts an exemplary environment 800 to implement several data store systems, each of which is dedicated to a certain geographic region in accordance with embodiments of the present invention. For example, one data store system is dedicated to region "A" and another data store system is dedicated to region "B." Different instances of the partitioning service, such as partitioning service (1) 810 and partitioning service (2) 830, may be associated with each region. Likewise, different instances of the global data service are also deployed to manage global data stores 814, 834 of each region.

In one embodiment, the global data stores of regions may be replicated through an entire "cross-shopper-set." A "cross-shopper-set" refers to a set of regions across which "cross-shopping" activities are allowed. To facilitate customer services across the regions, the global data store may include a global customer mapping table in addition to other mapping tables discussed above. The global customer mapping table may represent a customer's ID and its region relationship. Thus, all the customer IDs across the "cross-shopping-set" may have entries in the global customer mapping table. The global customer mapping table is utilized to identify a region for an outside region customer based on a customer ID.

Unlike a global data store, a customer data store 816, 836 is not replicated across the regions. Thus, a separate bucket-to-partition mapping table is maintained for each region. As described above, each data partition may have a replication of the customer data in a secondary database; however, replication of data partitions does not exist between regions. This customer data separation among the regions may create situations for activities related to "cross-shopping."

In one embodiment, each region may also maintain information about outside region customers in a list of outside region customers. The list of outside region customers includes information about an outside region customer, such as a customer ID and the region in which the customer is "homed." For example, if any customers who were created in region "A" have been queried recently in region "B," the customers are outside region customers, which may be stored and maintained in the list of outside region customers for region "B." The list of outside region customers may be utilized for an efficient region search for an outside region customer who has a history of performing "cross-shopping" activities. Thus, when an access request for customer data is received by the partitioning service (1) 810, the partitioning service (1) 810 may first attempt to look up the customer ID of the customer data in the list of outside region customers.

In one embodiment, in order for efficient access, the list of outside region customers may be preferably stored in an in-memory cache. If the customer ID is found in the list of outside region customers, the partitioning service (1) 810 will identify the region where the customer is "homed" and forward the request to another partitioning service (e.g., partition service (2) 830) for the region where the customer is "homed." If the customer ID is not found in the list of outside region customers, the partitioning service (1) 810 assumes that the customer ID is "homed" on the customer data store of region "A." The partitioning service (1) 810 then hashes the customer ID to identify a corresponding bucket and looks up a bucket-to-partition mapping table of region "A." After the partitioning service (1) 810 determines a partition, the request is forwarded to the partition. If the partition can not find corresponding customer data, this indicates that the customer ID is for an outside region customer (i.e., does not belong to the current region) or that the customer ID is invalid.

In this case, the partitioning service (1) 810 determines whether the customer ID is invalid via a lookup in a global customer mapping table and, if it is invalid, the partitioning service (1) 810 discards the request. Otherwise, the partitioning service (1) 810 may create a new entry for this customer ID in the list of out region customers for region "A" and forward the request to a remote region determined from the global customer mapping table. Subsequently, the remote region may provide the customer data in accordance with the request.

In an illustrative embodiment, when creating new customers, the partitioning service may assume that the new customers are homed in the region where the partitioning service is associated. For example, if a customer creates his account on region "B," then the customer data will be stored in a data store of region "B," although the customer does not physically live in region "B." As discussed above, the partitioning service is responsible for inserting an entry into the global customer mapping table whenever a new customer is created. Existing customers will be associated with whatever region in which they were created.

Figure 9:
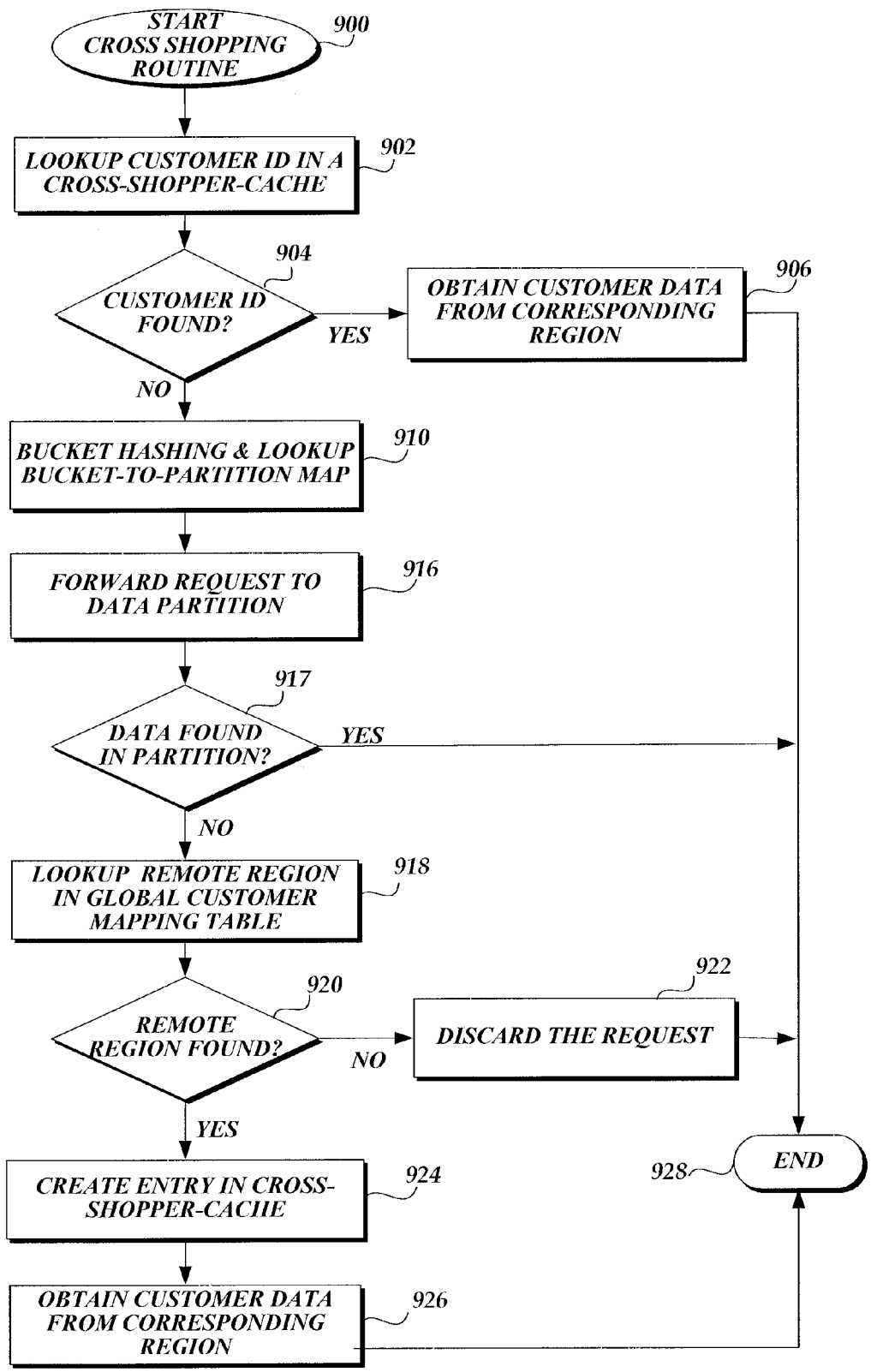
FIG. 9 is a flow diagram illustrating a cross-shopping routine implemented in the exemplary environment of FIG. 8, in accordance with embodiments of the present invention.

Referring to FIG. 9, a flow diagram depicts a cross-shopping routine 900 in accordance with embodiments of the present invention.

As with FIG. 8, when a request for "cross-shopping" is received from a customer service server, a partitioning service in an "originating region" forwards the request to the partitioning service in an appropriate "remote region" where the request can be served and obtains the result from the partitioning service in the remote region. An "originating region," as used herein, refers to a region in which a request for "cross-shopping" originates. A "remote region," as used herein, refers to one of regions in the "cross-shopping-set," which is different from the originating region.

For the purpose of discussion, assume that an access request for customer data is received by a partitioning service of an originating region and the partitioning service has identified or obtained a customer ID of the customer. As described above, if the request is about a secondary key, the customer ID can be obtained from the global data service via a secondary-to-partitionable key mapping. Those requests including a secondary key for which a secondary-to-partitionable key mapping is not defined or several customer IDs are determined after the secondary to partitionable key mapping, will be discussed in a greater detail in FIGS. 10 and 11 respectively.

Beginning at block 902, the partitioning service may first attempt to look up the customer ID in the list of outside region customers. At decision block 904, a determination is made as to whether the customer ID is found in the list of outside region customers. If the customer ID is found in the list of outside region customers, at block 906 the partitioning service may forward the request to a partitioning service of a remote region based on the list of outside region customers. The partitioning service identifies, from the list of outside region customers, the remote region corresponding to the customer ID. Subsequently, the partitioning service obtains customer data from the partitioning service of the identified remote region. If the customer ID is not found in the list of outside region customers, at block 910 the partitioning service assumes that the customer ID is "homed" in the originating region. The partitioning service then hashes the customer ID to a corresponding bucket ID. As with FIG. 6, the partitioning service determines a data partition by looking up a bucket-to-partition mapping table, which is predefined for the customer data store of the originating region. At block 916, the partitioning service may forward the request to the determined data partition. If the customer ID is "homed" in the originating region, the determined data partition is able to access and provides the customer data back to the partitioning service. Otherwise, the determined data partition may provide an indication that the requested customer data is not found in the data partition and thus the customer ID may be "homed" in one of the remote regions.

At decision block 917, a determination is made as to whether customer data corresponding to the customer ID is found within the determined data partition. If the customer data is not found in the determined data partition, at block 918 the partitioning service may look up the customer ID in a global customer mapping table. At decision block 920, a determination is made whether the customer ID is found from the global customer mapping table. If the customer ID is not found from global customer mapping table or maps to the originating region, the partitioning service assumes that the request is invalid and, thus, discards the request as illustrated at block 922. If the customer ID is found from the global customer mapping table and maps to a region other than the originating region, the partitioning service may create a new entry for this customer ID in the list of outside region customers, as illustrated at block 924. At block 926, the remote region associated with the customer ID may be determined from the global customer mapping table and obtain data from the partitioning service of the remote region. In one embodiment, a cross-WAN call may be made to the partitioning service of the remote region in order to serve the request.

After obtaining the customer data from the remote region (block 906), the data partition (decision block 917) or discarding the request (block 922), the routine completes at block 928.

Figure 10:
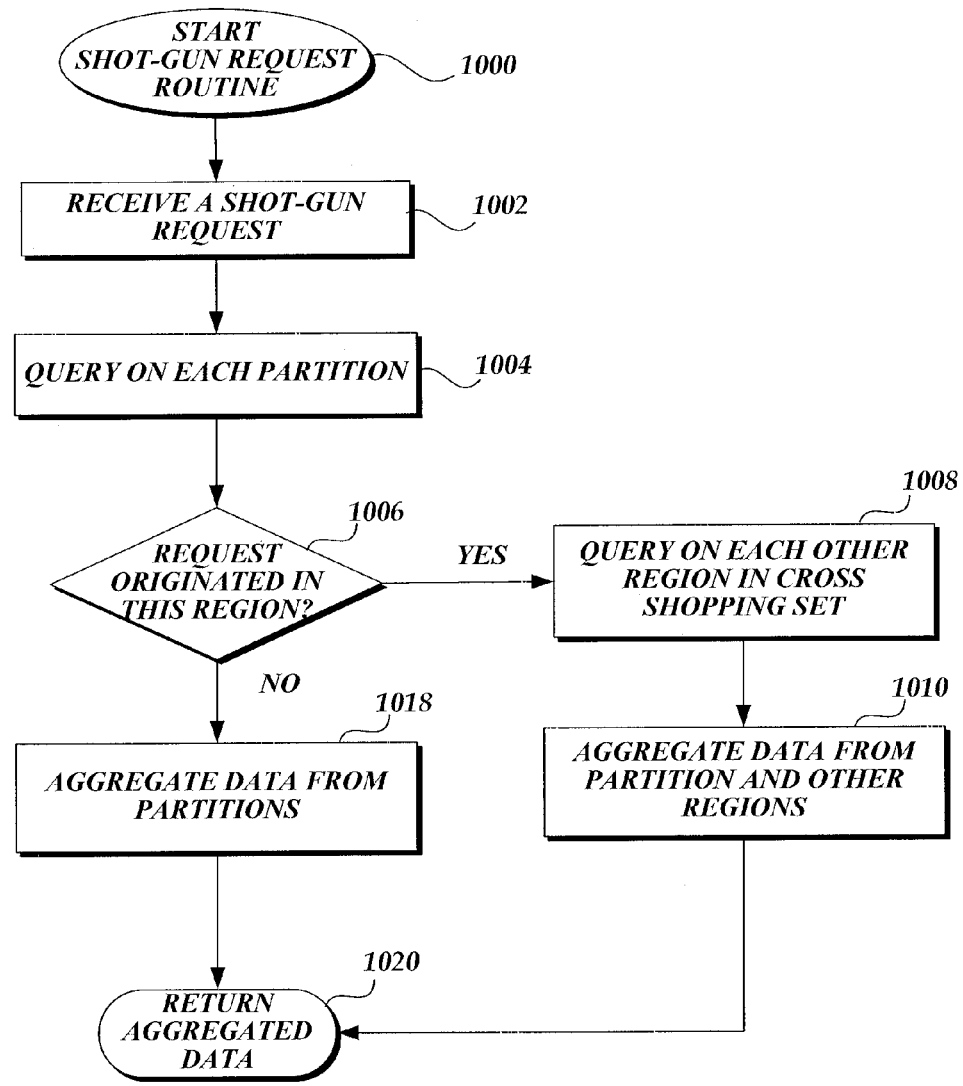
FIG. 10 is a flow diagram illustrating a shotgun request routine implemented in the exemplary environment of FIG. 8, in accordance with embodiments of the present invention.

With a reference to FIG. 10, a flow diagram depicts a shotgun request routine 1000 in accordance with embodiments of the present invention. As discussed above, there are some secondary keys which are hard (or impractical) to be indexed in order to facilitate "shotgun" type requests across regions. For example, it is impractical to have an index table for the customer's last name since there can be so many customers having a common last name. Thus, when "shotgun" type requests are received, the request may be forwarded to each region in the corresponding "cross-shopping-set" and results may be aggregated from several regions.

At block 1002, the partitioning service receives a "shotgun" type request. At block 1004, the partitioning service performs the appropriate query on each partition within the local region that the partitioning service is associated with. At a decision block 1006, a determination is made as to whether the request has originated from the local region. If it is determined that the request is originated in the local region, at block 1008 the request may be forwarded to a partitioning service for each remote region in the "cross-shopping-set." At block 1010, results are aggregated from the remote regions and the partitions. If it is determined at decision block 1006 that the request has not originated from the local region, at block 1018 the results are aggregated from the partitions. At block 1020, all the aggregated data may be returned and the routine 1000 completes.

In one embodiment, the majority of the "shotgun" type requests may need to obtain all matching customer data across the regions. However, it is contemplated that, if the request is for a specific piece of data, the specific piece of data may be searched and obtained instead of being aggregated. Thus, if it has found the desired data after a data partition or a remote region is checked, the process may stop that point rather than proceeding to the next data partition or the next remote region.

Figure 11:
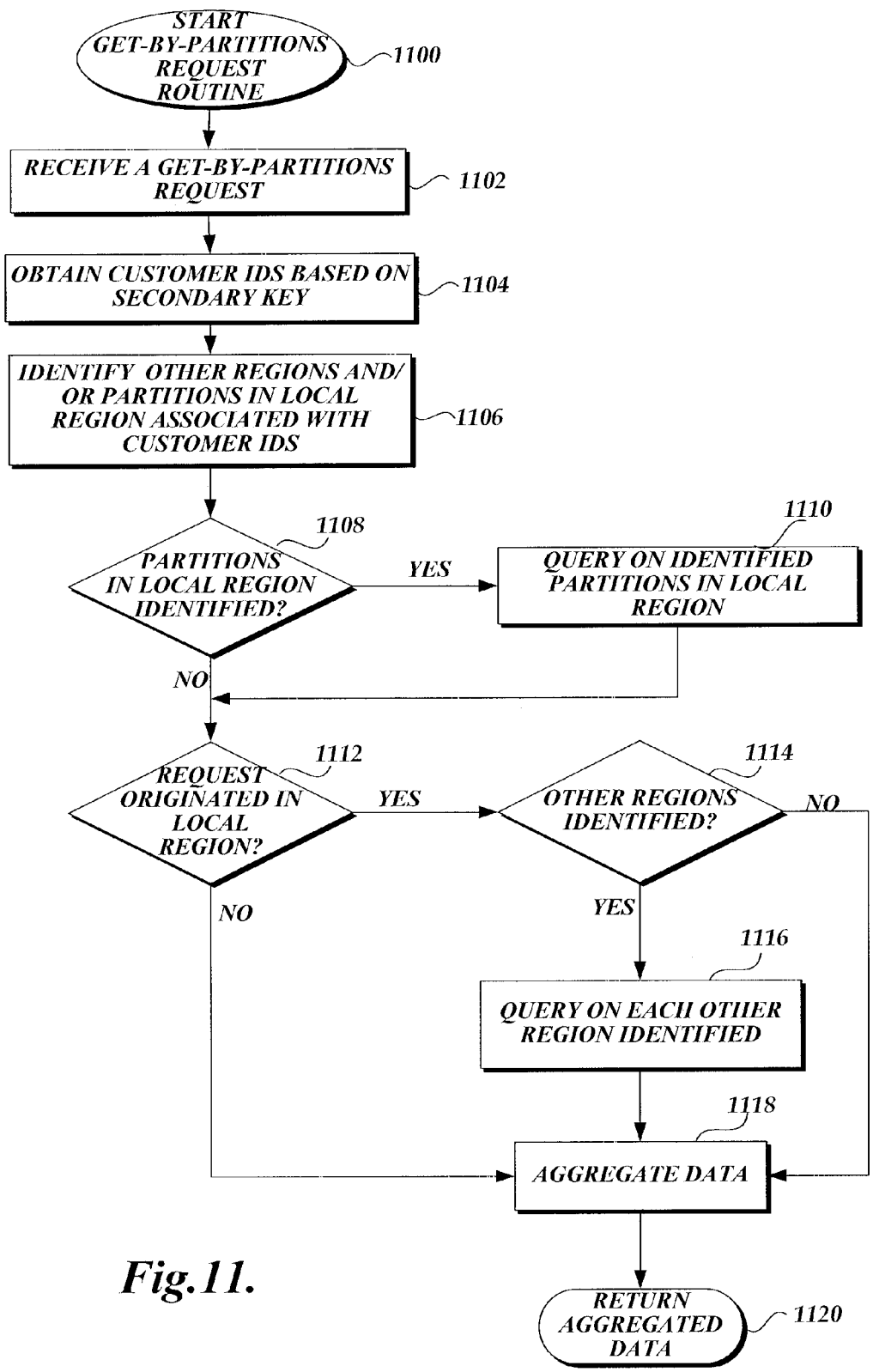
FIG. 11 is a flow diagram illustrating a get-by-partition request routine implemented in the exemplary environment of FIG. 8, in accordance with embodiments of the present invention.

With a reference to FIG. 11, a flow diagram depicts a get-by-partition request routine 1100 in accordance with embodiments of the present invention. As discussed above, some requests are directed to access customer information about multiple customers. Some of such requests are referred herein as "get-by-partition" type requests which generally include non-unique secondary keys which can be mapped to one or more customer IDs in the global data store. For example, a request to access customer information based on a phone number may be a get-by-partition type request since several customers can share one phone number. In some instances, multiple partitions in the local region and/or multiple regions may be queried in order to serve a get-by-partition type request.

At block 1102, the partitioning service receives a get-by-partition type request which may include one or more secondary keys, each of which has a secondary key mapping table in the global data store. At block 1104, the partitioning service communicates with a global data service to obtain partitionable keys (e.g. customer IDs) corresponding to the secondary keys. As mentioned above, a secondary key can be mapped into several customer IDs which belong to different regions. At block 1106, for each customer ID, the partitioning service may identify a region associated with the customer ID. As with FIGS. 9 and 10, a region associated with the customer ID may be identified via a global customer mapping table. If the customer ID belongs to the local region, the partitioning service may identify data partition corresponding to the customer ID in the local region via bucket-to partition mapping. As illustrated at block 1106, for the obtained customer IDs, a list of partitions and/or a list of remote regions may be identified.

At a decision block 1108, a determination is made as to whether any data partitions in the local region are identified based on the customer IDs. If it is determined that data partitions in the local region are identified, at block 1110, the partitioning service performs the appropriate query on the identified data partitions within the local region. If it is determined at a decision block 1108 that no data partition in the local region is identified based on the customer IDs, or after block 1110, at decision block 1112, a determination is made as to whether the request has originated from the local region. As will be appreciated by one of ordinary skill in the art, if the request has not originated from the local region (i.e., the request is forwarded from one of the other regions), the request is not to be forwarded to the other remote regions.

If it is determined at decision block 1112 that the request has originated from the local region, at decision block 1114, a determination is made as to whether other remote regions are identified. If other remote regions are identified, the partitioning service may query on the identified remote regions by forwarding the request at block 1116. If the request has not originated from the local region (decision block 1112), or after querying on the identified remote region, at block 1118 customer data may be aggregated from the list of data partitions and/or the list of the remote regions. The routine 1100 returns the aggregated data and completes at block 1120.

Figure 12A:
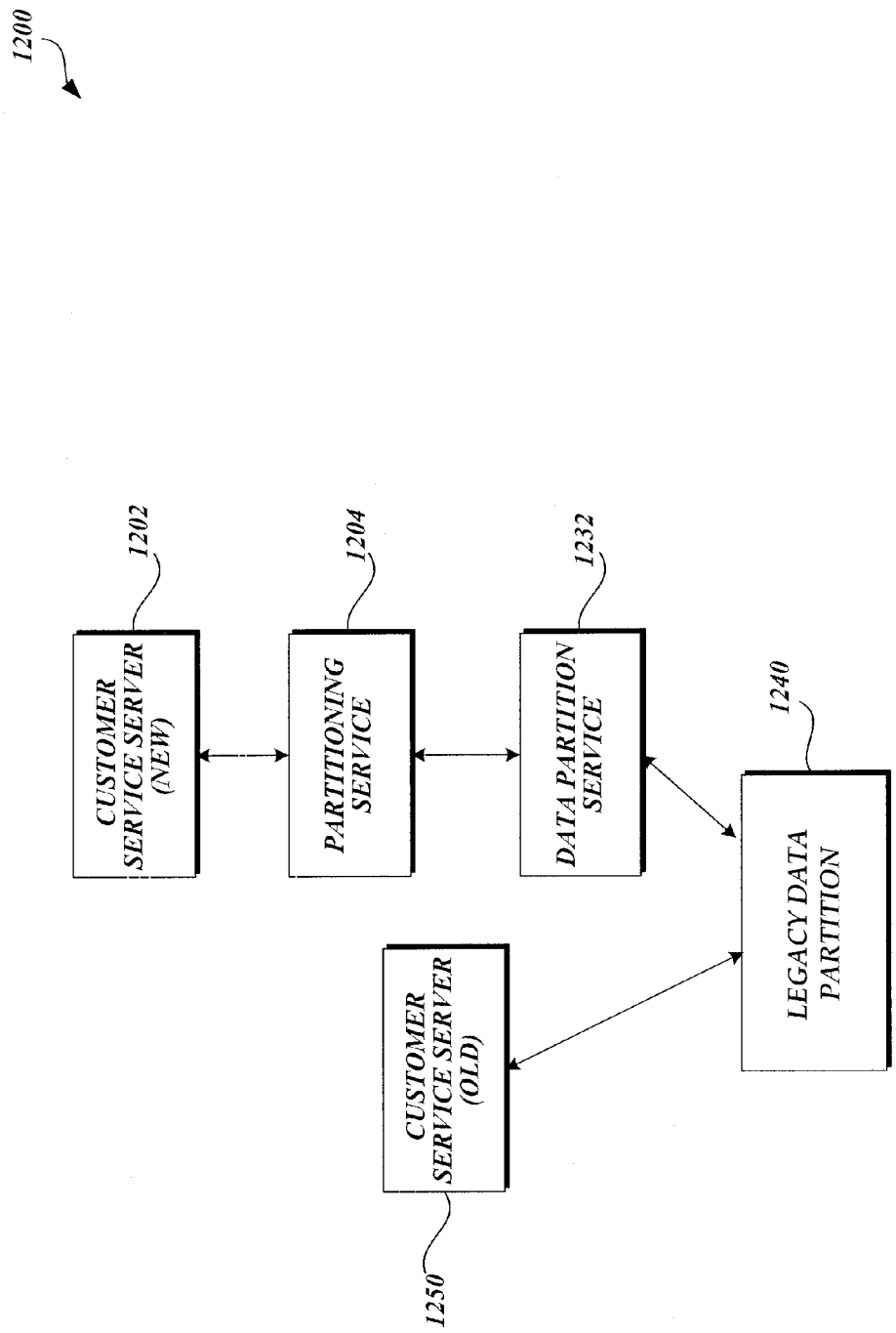
FIGS. 12A-12B are pictorial diagrams depicting an exemplary system environment where a legacy database is converted into a partitioned data store system, in accordance with embodiments of the present invention.
Figure 12B:
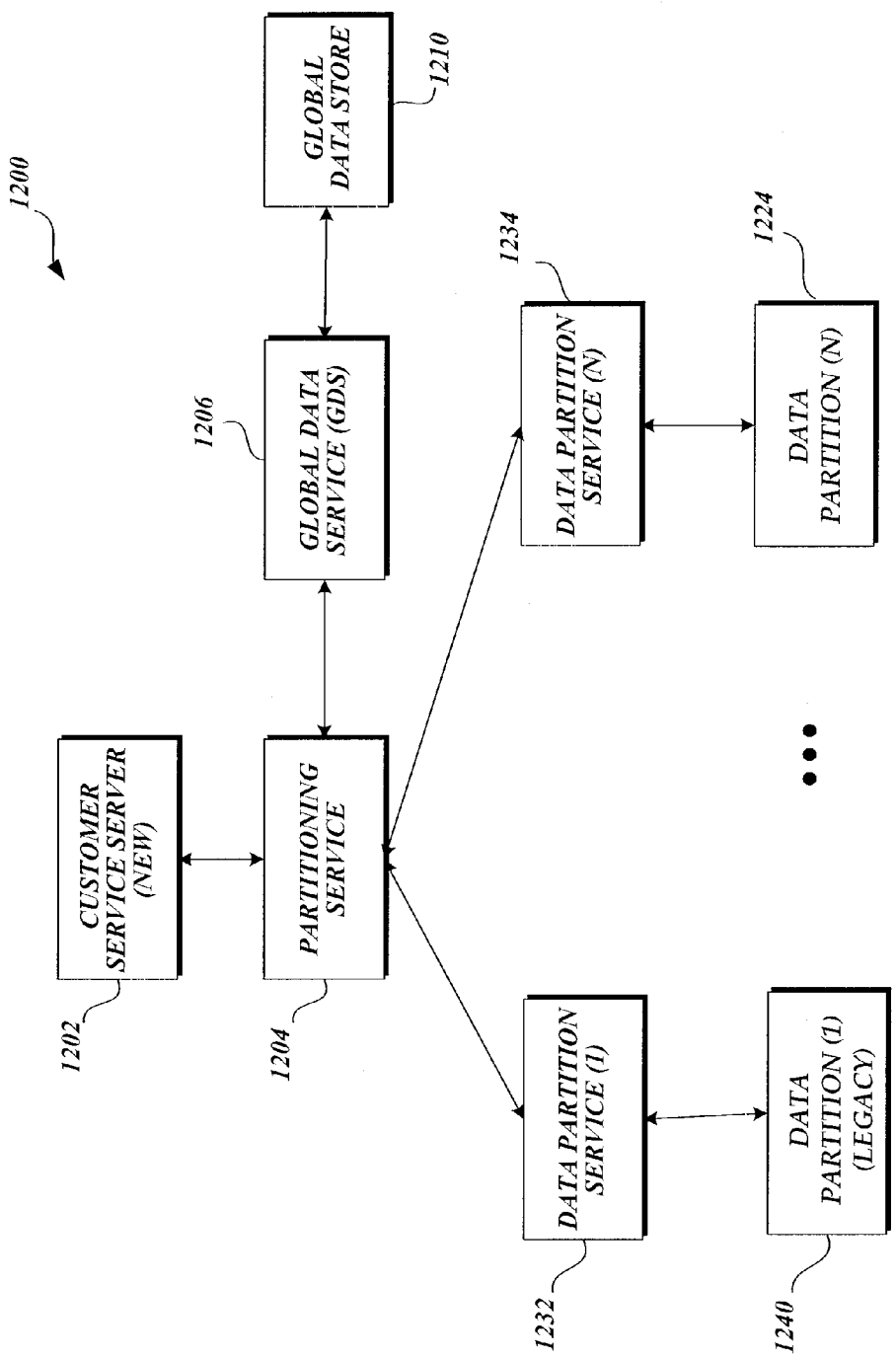

Referring to FIGS. 12A and 12B, pictorial diagrams depict an exemplary system environment 1200 where a legacy database is converted into a partitioned data store system without requiring new software at the client services in accordance with embodiments of the present invention.

As will be appreciated by one of ordinary skill in the art, a conversion of the existing underlying database to a new structured database creates significant problems, let alone that it is costly and time consuming. In addition, most database conversions may require software changes in the client services. However, it is also true that the reconstruction of some underlining single databases is inevitable in order to cure frequent blackout or brownout problems. In an advantageous aspect of the present invention, any legacy customer database can be reconstructed or converted to a customer data store in a partitioning platform without requiring any software change in the client services. In order to mitigate some known problems for the database reconstruction, the legacy database may be converted into a customer data store system in partitioning framework in multiple phases. The amount of change may be determined in a manner such that the amount of risk associated with the change can be tolerable in each phase.

Referring to FIG. 12A, a legacy customer database and a customer data store system coexist as an initial phase in accordance with embodiments of the present invention. While a customer service server 1250 for the legacy customer database 1240 is responsible for the client services, a new customer service server 1202 configured to communicate with a partitioning service 1204 may be deployed. A partitioning service 1204 and a data partition service 1232 are also launched for accessing customer data in the legacy customer database 1240. The legacy customer database 1240 may be considered as a single data partition to which all buckets map. Both old customer service server 1250 and new customer service server 1202 may be able to access the legacy customer database.

In the next phase, a global data store 1210 may be added to the customer data store system and global data will be copied from the legacy customer database 1240 to the global data store as shown in FIG. 12B. A global data service 1206 may be deployed and configured to communicate with the partitioning service 1204. After the global data is migrated from the legacy customer database 1240 to the global data store 1210, all service requests for accessing global data may be forwarded to partitioning service.

FIG. 12B depicts the next phase where new data partitions 1224 are added to the exemplary system environment 1200 in accordance with embodiments of the present invention. Each data partition 1224 has an associated data partition service 1234 launched. Subsequently, buckets associated with the legacy customer database 1240 are redistributed to the data partitions. The bucket-to-partition mapping is updated to reflect this redistribution. For each redistributed bucket, customer data in the legacy customer database 1240 (now it behaves as a data partition) may be migrated to a data partition associated with the bucket by utilizing the routine 700. Here, the legacy customer database 1240 may be an old data partition for a bucket that is in process of migration and thus the bucket within the legacy customer database 1240 may be locked for the migration process. Eventually, no customer data remains to be migrated in the legacy customer database 1240. After the customer data has been migrated from the legacy customer database 1240 to the new data partitions, the legacy customer database 1240 can be used as a data partition of the customer data store. In such a case, a data partition service 1232 may be configured suitably for accessing the data partition that used to be the legacy customer database. Several buckets are reassigned back to the new data partition (previously legacy customer database). The bucket-to-partition mapping table is updated to reflect this change. The customer data corresponding to the reassigned buckets may be migrated back to the new data partition.

Although the aforementioned examples and embodiments are discussed in conjunction with customer data and customer IDs, it is to be understood that any suitable data can be maintained in a data store system utilizing a scalable partitioning framework. Further, any partitionable key can be used to determine a partition corresponding to certain data. It is contemplated that a bucket may not be necessarily utilized if a partitionable key and its corresponding partition can be mapped without creating unwanted dependencies in a data store.

While illustrative embodiments have been illustrated and described, it will be appreciated that various changes can be made therein without departing from the spirit and scope of the invention.

The embodiments of the invention in which an exclusive property or privilege is claimed are defined as follows:

1. A computer-implemented method for accessing information about a customer stored in a plurality of data stores, the computer-implemented method comprising:
  under control of instructions that are executed by one or more computing devices:
    receiving, at a first data store of the plurality of data stores, a request to access information about the customer,
      wherein the information about the customer is stored in one of the plurality of data stores,
      wherein each of the plurality of data stores has a plurality of partitions,
      wherein each partition of the plurality of partitions includes a plurality of buckets associated therewith,
      wherein each bucket of the plurality of buckets contains a plurality of partitionable keys related to a subset of customers whose customer information is stored in the partition such that the bucket represents a portion of the customer information stored in the partition,
      wherein each of the plurality of data stores is associated with a set of customers based, at least in part, on a geographic location associated with each of the set of customers, and
      wherein each geographic location is associated with a single data store from the plurality of data stores;
    identifying from the received request a partitionable key from the plurality of partitionable keys related to the subset of customers related to the customer;
    identifying from the identified partitionable key the single data store from the plurality of data stores which contains the identified partitionable key, wherein the identification is based at least in part on a determined geographical location of the customer;
    if the identified single data store corresponds to the first data store:
      using the identified partitionable key to identify the bucket within the first data store that contains the identified partitionable key;
      performing a bucket mapping using the identified bucket to determine the partition within the first data store with which the identified bucket is associated;
      determining whether the portion of the customer information stored in the partition represented by the identified bucket is accessible for the received request; and
      if it is determined that the portion of the customer information represented by the identified bucket is accessible for the received request:
        sending to a data partition service that manages the determined partition an access request for the information about the customer; and
        obtaining, from the data partition service, a result of the sent access request; and
    if the identified single data store does not correspond to the first data store:
      forwarding the received request to access information about the customer to the identified single data store.

2. The computer-implemented method of claim 1, wherein the using the identified partitionable key to identify the bucket includes applying a bucket hash function to the identified partitionable key, and
  wherein the applied bucket hash function returns a bucket identifier of the bucket that contains the identified partitionable key.

3. The computer-implemented method of claim 2, wherein the sent access request is one of a read request, a query request, an update request, or a create request.

4. The computer-implemented method of claim 3, further comprising:
  the determining of the partition within the first data store with which the identified bucket is associated using a first lookup table based on the returned bucket identifier and the identified partitionable key,
  wherein the first lookup table represents a bucket to partition mapping.

5. The computer-implemented method of claim 4, further comprising:
  if the sent access request is corresponds to an update request, determining whether the identified bucket which contains the identified partitionable key is locked,
  wherein a determination that the identified bucket which contains the identified partitionable key is locked indicates a process of migration of the customer information represented by the identified bucket.

6. The computer-implemented method of claim 5, further comprising:
  if the determination that the identified bucket which contains the identified partitionable key is locked and the determined partition is a partition from which the customer information represented by the identified bucket is migrating, denying the update request.

7. The computer-implemented method of claim 5, further comprising:
  if the determination that the identified bucket which contains the identified partitionable key is locked and the determined partition is a partition to which the customer information represented by the identified bucket is migrating, forwarding the update request to the determined partition.

8. The computer-implemented method of claim 1, further comprising:
  if the partitionable key related to the customer cannot be identified from the received request, identifying a non-partitionable key of the customer from the received request; and
  obtaining the partitionable key of related to the customer from a second lookup table based on the identified non-partitionable key of the customer,
  wherein the second lookup table represents a non-partitionable key-to-partitionable key mapping.

9. The computer-implemented method of claim 8, further comprising:
  if the non-partitionable key of the customer cannot be identified from the received request, broadcasting the access request to each partition of the plurality of partitions in the plurality of data stores and aggregating a result from each partition.

10. The computer-implemented method of claim 1, wherein each partition of the plurality of partitions is managed by a separate data partition service that is configured to manage the partition.

11. A computer system for accessing information about a customer stored in a plurality of customer data stores, wherein each customer data store from the plurality of customer data stores is associated with a distinct customer category, the computer system comprising:
 at least one memory for storing a first customer data store of the plurality of customer data stores,
  wherein each customer data store includes a plurality of partitions,
  wherein each customer data store is associated with one or more customer categories, and
  wherein each customer category from the one or more customer categories is associated with a single customer data store; and
 one or more computing devices in communication with the at least one memory, wherein the one or more computing devices are configured to implement a plurality of components, including:
  a customer service component associated with the first customer data store, wherein the customer service component comprises computer-executable code that, when executed by the one or more computing devices, carries out a method comprising:
   receiving a service request to access information about the customer,
   wherein the information about the customer is stored in one of the plurality of partitions of one of the plurality of customer data stores,
   wherein each partition of the plurality of partitions has a plurality of buckets associated therewith, and
   wherein each bucket from the plurality of buckets contains a plurality of partitionable keys related to a subset of customers whose customer information is stored in the partition such that each bucket represents a portion of the customer information stored in the partition; and
  a partitioning service component associated with the first customer data store, wherein the partitioning service component comprises computer-executable code that, when executed by the one or more computing devices, carries out a method comprising:
   processing the received service request to identify a partitionable key related to the customer;
   using the identified partitionable key to identify a customer data store of the plurality of customer data stores associated with the customer based at least in part on a customer category from the one or more customer categories associated with the customer; and
   if the identified customer data store corresponds to the first data store:
    identifying a bucket of the first customer data store that contains the identified partitionable key;
    performing a bucket mapping using the identified bucket to determine a partition of the first customer data store with which the identified bucket is associated; and
    determining whether the portion of the customer information stored in the determined partition represented by the identified bucket is accessible for the received service request;
    if it is determined that the portion of the customer information represented by the identified bucket is accessible for the received service request, sending, by the partitioning service component, to a data partition service configured to manage the determined partition an access request for the information about the customer; and
   if the identified customer data store does not correspond to the first customer data store, forwarding the received service request to a partitioning service component associated with the identified customer data store.

12. The computer system of claim 11, wherein the data partition service configured to manage the determined partition accesses the information about the customer in accordance with the sent access request.

13. The computer system of claim 12, wherein the partitioning service component returns a result of the sent access request which is obtained from the determined partition.

14. The computer system of claim 11, wherein each partition of the plurality of partitions is associated with at least one bucket that contains partitionable keys for a plurality of customers.

15. The computer system of claim 11, wherein the plurality of components further comprises:
 a global data service component, wherein the global data service component comprises computer-executable code that, when executed by the one or more computing devices, causes maintaining a plurality of mapping tables, wherein each mapping table from the plurality of mapping tables relates to a corresponding non-partitionable key and each mapping table represents a non-partitionable key-to-partitionable key mapping for the corresponding non-partitionable key.

16. The computer system of claim 15, wherein if the partitioning service component cannot identify the partitionable key related to the customer from the received service request, the partitioning service component identifies a non-partitionable key of the customer from the received service request.

17. The computer system of claim 16, wherein the partitioning service component obtains the partitionable key related to the customer from the global data service component based on the identified non-partitionable key of the customer.

18. The computer system of claim 11, wherein each partition of the plurality of partitions is managed by a separate data partition service that is configured to manage the partition.

19. A computer-implemented method for accessing information about a customer stored in a plurality of data stores, wherein each data store of the plurality of data stores includes a plurality of partitions, the computer-implemented method comprising:
 under control of instructions that are executed by one or more computing devices:
  receiving, at a first data store of the plurality of data stores, a request to access information about the customer,
   wherein the information about the customer is stored in one of the plurality of partitions of one of the plurality of data stores,
   wherein each partition of the plurality of partitions has at least one set of a plurality of sets of partitionable keys associated therewith,
   wherein each set of partitionable keys from the plurality of sets of partitionable keys includes a plurality of partitionable keys related to a subset of customers whose customer information is stored in a single data store from the plurality of data stores such that a set of partitionable keys represents a portion of the customer information stored in a partition, wherein each of the plurality of data stores is associated with one or more customer categories, and wherein each customer category from the one or more customer categories is associated with the single data store from the plurality of data stores;

identifying from the received request a partitionable key from the plurality of partitionable keys related to the subset of customers related to the customer;

identifying from the identified partitionable key the single data store from the plurality of data stores which contains the identified partitionable key, where the identification is based at least in part on a customer category associated with the customer;

if the identified single data store corresponds to the first data store:

using the identified partitionable key to identify the set of partitionable keys within the first data store that includes the identified partitionable key;

determining, based on the identified set of partitionable keys, the partition within the first data store where the information about the customer is stored;

determining whether the information about the customer is accessible for the received request based on whether the portion of the customer information that is represented by the identified set of partitionable keys is accessible for the received request; and if it is determined that the portion of the customer information is accessible for the received request:

sending to a data partition service that manages the determined partition an access request for the information about the customer; and obtaining, from the data partition service, a result of the sent access request from the determined partition; and if the identified single data store does not correspond to the first data store:

forwarding the received request to access information about the customer to the identified single data store.

20. The computer-implemented method of claim 19, further comprising:

if the partitionable key related to the customer cannot be identified from the received request, identifying a non-partitionable key of the customer from the received request; and obtaining the partitionable key related to the customer from a lookup table based on the identified non-partitionable key of the customer, wherein the lookup table represents a non-partitionable key-to-partitionable key mapping.

21. The computer-implemented method of claim 20, further comprising:

if the non-partitionable key of the customer cannot be identified from the received request, broadcasting the access request to each partition of the plurality of partitions in the plurality of data stores and aggregating a result from each partition.

22. The computer-implemented method of claim 19, wherein each partition of the plurality of partitions is managed by a separate data partition service that is configured to manage the partition.

23. A computer system for accessing information about a customer stored in a plurality of customer data stores, wherein each customer data store from the plurality of customer data stores is associated with one or more customer categories and wherein each customer category from the one or more customer categories is associated with a single customer data store, the computer system comprising:

at least one memory for storing a first customer data store of the plurality of customer data stores, wherein each customer data store includes a plurality of partitions, and wherein the first customer data store is associated with at least a first customer category from the one or more customer categories; and one or more computing devices in communication with the at least one memory, wherein the one or more computing devices are configured to implement a plurality of components, including:

a customer service component associated with the first customer data store, wherein the customer service component comprises computer-executable code that, when executed by the one or more computing devices, carries out a method comprising:

receiving a service request to access information about the customer, wherein the information about the customer is stored in one of one of the plurality of customer data stores, wherein each partition of the plurality of partitions has at least one set of a plurality of sets of partitionable keys associated therewith, and wherein each set of partitionable keys from the plurality of sets of partitionable key includes a plurality of partitionable keys related to a subset of customers whose customer information is stored in a single customer data store from the plurality of customer data stores such that each set of partitionable keys represents a portion of the customer information stored in the partition; and a partition partitioning service component associated with the first customer data store, wherein the partitioning service component comprises computer-executable code that, when executed by the one or more computing devices, carries out a method comprising:

processing the received service request to identify a partitionable key related to the customer;

using the identified partitionable key to identify a customer data store of the plurality of customer data stores associated with the customer based at least in part on a customer category from the one or more customer categories associated with the customer; and if the identified customer data store corresponds to the first data store:

identifying a set of partitionable keys of the first customer data store that includes the identified partitionable key;

determining, based on the identified set of partitionable keys, a partition of the first customer data store where the information about the customer is stored; and determining whether the information about the customer is accessible for the received service request based on whether the portion of the customer information that is represented by the identified set of partitionable keys is accessible for the received service request;

if it is determined that the portion of the customer information is accessible for the received service request, sending, by the partitioning service component, to a data partition service that is configured to manage the determined partition an access request for the information about the customer; and if the identified customer data store does not correspond to the first customer data store, forwarding the received service request to a partitioning service component associated with the identified customer data store.

24. The computer system of claim 23, wherein the data partition service accesses the information about the customer data based on the sent access request.

25. The computer system of claim 24, wherein the partitioning service component returns a result of the sent access request which is obtained from the determined partition.

26. The computer system of claim 23, wherein each partition of the plurality of partitions is managed by a separate data partition service that is configured to manage the partition.

* * * * *